(12) United States Patent
Chiba et al.

(10) Patent No.: US 10,661,640 B2
(45) Date of Patent: May 26, 2020

(54) RESIN BACK DOOR FOR VEHICLE

(71) Applicants: TOYOTA JIDOSHA KABUSHIKI KAISHA, Toyota-shi, Aichi-ken (JP); TOYOTA JIDOSHA KYUSHU KABUSHIKI KAISHA, Miyawaka-shi, Fukuoka-ken (JP)

(72) Inventors: Kenji Chiba, Tokai (JP); Takayuki Okubo, Toyota (JP); Shingo Koyama, Fukutsu (JP)

(73) Assignees: TOYOTA JIDOSHA KABUSHIKI KAISHA, Toyota (JP); TOYOTA JIDOSHA KYUSHU KABUSHIKI KAISHA, Miyawaka (JP)

( * ) Notice: Subject to any disclaimer, the term of this patent is extended or adjusted under 35 U.S.C. 154(b) by 15 days.

(21) Appl. No.: 16/216,347

(22) Filed: Dec. 11, 2018

(65) Prior Publication Data

US 2019/0193534 A1    Jun. 27, 2019

(30) Foreign Application Priority Data

Dec. 21, 2017   (JP) ................................. 2017-244676

(51) Int. Cl.
*B60J 5/10*    (2006.01)
*E05F 3/22*    (2006.01)

(52) U.S. Cl.
CPC ............... *B60J 5/107* (2013.01); *B60J 5/101* (2013.01); *B60J 5/102* (2013.01); *E05F 3/221* (2013.01); *E05F 3/224* (2013.01); *E05Y 2900/132* (2013.01)

(58) Field of Classification Search
CPC ..... B60J 5/10; B60J 5/101; B60J 5/102; B60J 5/107; E05Y 2900/532; E05Y 2900/546; E05F 3/02; E05F 3/221; E05F 3/224
USPC ..................................... 296/56, 146.8, 146.9
See application file for complete search history.

(56) References Cited

U.S. PATENT DOCUMENTS

| 10,384,520 | B2 * | 8/2019 | Kuntze | .................... B60J 5/101 |
| 2004/0036318 | A1 * | 2/2004 | Maeda | ..................... B60J 5/103 296/146.8 |
| 2007/0096502 | A1 * | 5/2007 | Hakamata | ................ B60J 5/101 296/146.8 |
| 2010/0102589 | A1 * | 4/2010 | Miyake | .................... B60J 5/107 296/146.8 |
| 2010/0102590 | A1 * | 4/2010 | Miyake | .................... B60J 5/101 296/146.8 |

(Continued)

FOREIGN PATENT DOCUMENTS

| JP | 2009-234417 A | 10/2009 |
| JP | 2011-136606 A | 7/2011 |
| JP | 5846036 B2 | 1/2016 |

*Primary Examiner* — Gregory A Blankenship
(74) *Attorney, Agent, or Firm* — Oliff PLC (57) ABSTRACT

A resin back door for a vehicle includes a resin inner panel, a resin lower outer panel, a metal left reinforcing member, and a damper stay bracket. The metal left reinforcing member is disposed in a hollow space defined by the inner panel and the lower outer panel, and is fixed to the inner panel with an adhesive leaving a gap. The damper stay bracket is attached on an outer side of the inner panel in a vehicle width direction. In the resin back door for a vehicle, the damper stay bracket is fastened to the left reinforcing member across a collar having one end inserted into a hole provided in the inner panel.

2 Claims, 11 Drawing Sheets

(56) References Cited

U.S. PATENT DOCUMENTS

| | | | |
|---|---|---|---|
| 2011/0074179 A1* | 3/2011 | Kuntze | B60J 5/107 296/146.6 |
| 2012/0248814 A1* | 10/2012 | Tsukiyama | B60J 5/101 296/146.8 |
| 2014/0152038 A1* | 6/2014 | Crane | B62D 35/007 296/56 |
| 2014/0203591 A1* | 7/2014 | Lathwesen | B60J 5/107 296/146.8 |
| 2016/0167493 A1* | 6/2016 | Adachi | B60J 5/107 49/502 |
| 2016/0347155 A1* | 12/2016 | Kuntze | B62D 29/043 |
| 2019/0168589 A1* | 6/2019 | Aldersley | B60J 1/18 |
| 2019/0193534 A1* | 6/2019 | Chiba | B60J 5/102 |

\* cited by examiner

RESIN BACK DOOR FOR VEHICLE

CROSS REFERENCE TO RELATED APPLICATION

This application claims priority to Japanese Patent Application No. 2017-244676 filed on Dec. 21, 2017, which is incorporated herein by reference in its entirety including the specification, claims, drawings, and abstract.

TECHNICAL FIELD

The present disclosure relates to a structure of a resin back door for a vehicle, in particular to a structure of a damper stay bracket-mounted portion.

BACKGROUND

Vehicles which include opening portions positioned at rear end portions of the vehicles that are opened and closed by back doors have been widely used, facilitating access to cargo spaces positioned in back of rear seats of the vehicles.

Such a back door of a vehicle is a hatch back door having an upper portion turnably attached to a vehicle upper structure via a pair of right and left hinges, and vertically turned around the hinges to open and close. The back door uses a structure in which a damper stay is bridged between the back door and a body to reduce an operation force for opening the back door and to maintain the opening state of the back door (e.g., see JP 2009-234417 A).

Furthermore, in recent years, many vehicle doors made of resin have been used. The doors made of resin have a reduced weight but ensuring rigidity is difficult as compared with doors made from steel plate. For this reason, a structure has been proposed to mount a metal reinforcing member in a hollow space defined by a resin inner panel and a resin outer panel (e.g., see JP 5846036 B). As such a structure, a configuration to fix a metal reinforcing member to a resin inner panel with an adhesive is known (e.g., see JP 2011-136606 A).

SUMMARY

Incidentally, a resin back door including a resin, as described in JP 2011-136606 A, may be used in some cases, in place of a back door made from a steel plate, as described in JP 2009-234417 A. The resin back door employs a configuration for fixing a damper stay bracket on the outside of the door in a vehicle width direction and turnably attaching a damper stay to the damper stay bracket. Since a load is applied to the damper stay bracket upon opening and closing the door, the damper stay bracket is often fastened to a reinforcing member inside a resin inner panel rather than being fixed to the inner panel.

A resin inner panel and a metal reinforcing member each have manufacturing tolerances. Therefore, when the metal reinforcing member is fixed to the resin inner panel with an adhesive, a gap varies between the reinforcing member and the inner panel. In contrast, when a reinforcing member disposed inside the inner panel and a damper stay bracket on the outside of the inner panel are fastened together with a bolt or the like via the inner panel, the inner panel may be deformed toward the reinforcing member, resulting in deformation of the outer peripheral shape of the resin back door.

Therefore, an object of the present disclosure is to ensure the attachment strength of a damper stay bracket in a resin back door and suppress deformation of an outer peripheral shape of the resin back door attached.

Solution to Problem

A resin back door for a vehicle according to the present disclosure includes a resin inner panel, a resin outer panel, a metal reinforcing member, and a damper stay bracket. The metal reinforcing member is disposed in a hollow space defined by the inner panel and the outer panel, and is fixed to the inner panel with an adhesive leaving a gap. The damper stay bracket is attached on an outer side of the inner panel in a vehicle width direction. In the resin back door for a vehicle, the damper stay bracket is fastened to the reinforcing member via a collar having one end inserted into a hole provided in the inner panel.

Since the damper stay bracket is fastened to the reinforcing member via the collar having the one end inserted into the hole provided in the inner panel, even though a gap between the inner panel and the reinforcing member varies in width, the inner panel is not drawn toward the reinforcing member when attaching the damper stay bracket, and deformation of the outer shape of the resin back door can be suppressed when the damper stay bracket is attached. In addition, since the damper stay bracket is fixedly fastened to the reinforcing member, the mounting strength of the damper stay bracket can be ensured.

The resin back door for a vehicle according to the present disclosure may be configured so that the collar includes a flange having an outer diameter larger than an inner diameter of the hole provided in the inner panel at the other end opposite to the one end, and the resin back door for a vehicle includes an elastic member pressed between the flange of the collar and the inner panel around the hole.

Even though a variation in the width of a gap between an inner surface of the inner panel and a reinforcing member causes a variation in the width of a gap between an outer surface of the inner panel and the flange, an elastic member, such as a sponge or rubber, is compressed when a damper stay bracket is attached, and the compressed elastic member accommodates the variation in the width of the gap and seals around the hole in the inner panel. Thus, even though gaps vary in width, it is possible to effectively prevent entry of water into the resin back door from a hole in the inner panel.

Advantageous Effects of Invention

According to the present disclosure, the attaching strength of a damper stay bracket in a resin back door is ensured and deformation of an outer peripheral shape of the resin back door attached is suppressed.

BRIEF DESCRIPTION OF DRAWINGS

Embodiment(s) of the present disclosure will be described by reference to the following figures, wherein.

DESCRIPTION OF EMBODIMENTS

<Overall Structure of Resin Back Door>

Figure 1:
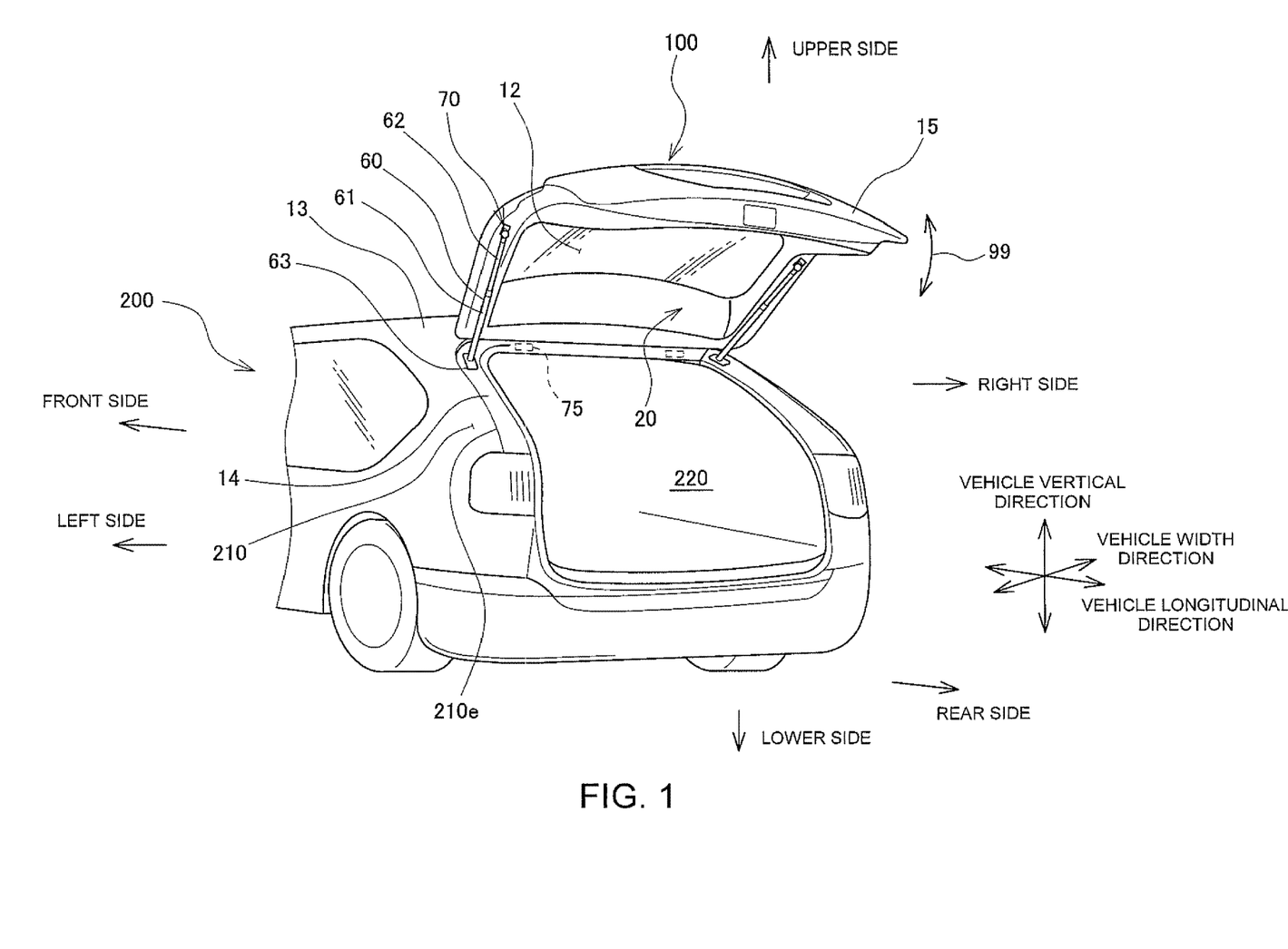
FIG. 1 is a perspective view of a vehicle to which a resin back door according to an embodiment is attached.

Hereinafter, a resin back door 100 according to embodiments will be described with reference to the drawings. As illustrated in FIG. 1, the resin back door 100 is a hatch door turnably attached to a roof panel 13 of a body 210 of a vehicle 200 via a pair of right and left hinges 75 provided at an upper end portion of the resin back door 100, and turned vertically about the hinges 75 as indicated by an arrow 99 to open and close.

Between a side surface of the resin back door 100 and a trough 14 having a groove shape and defined around a door opening 220 of the body 210, damper stays 60 are mounted to reduce an operation force for opening the resin back door 100 and maintain the opening state. Each of the damper stays 60 includes a cylindrical cylinder 61 and a rod-shaped piston rod 62 inserted into the cylinder 61. The cylinder 61 of the damper stay 60 has a body-side end portion pivotably assembled to a damper stay bracket 63 positioned on the body side fixed in the trough 14. The piston rod 62 of the damper stay 60 has a back door-side end portion pivotally assembled to a door-side damper stay bracket 70 attached on an outer side of the resin back door 100 in a vehicle width direction via a ball joint.

Figure 2:
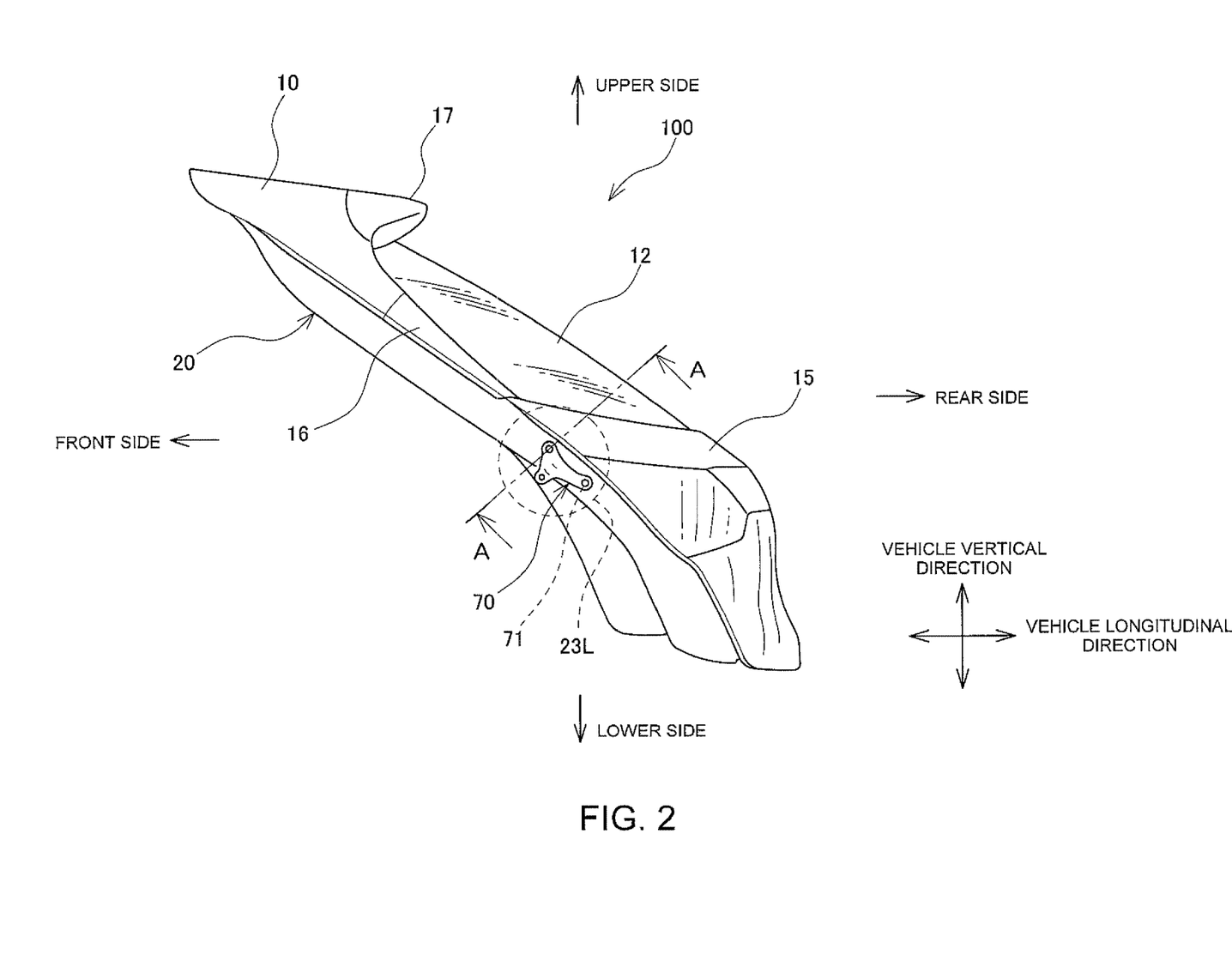
FIG. 2 is a side view of a resin back door according to an embodiment.
Figure 3:
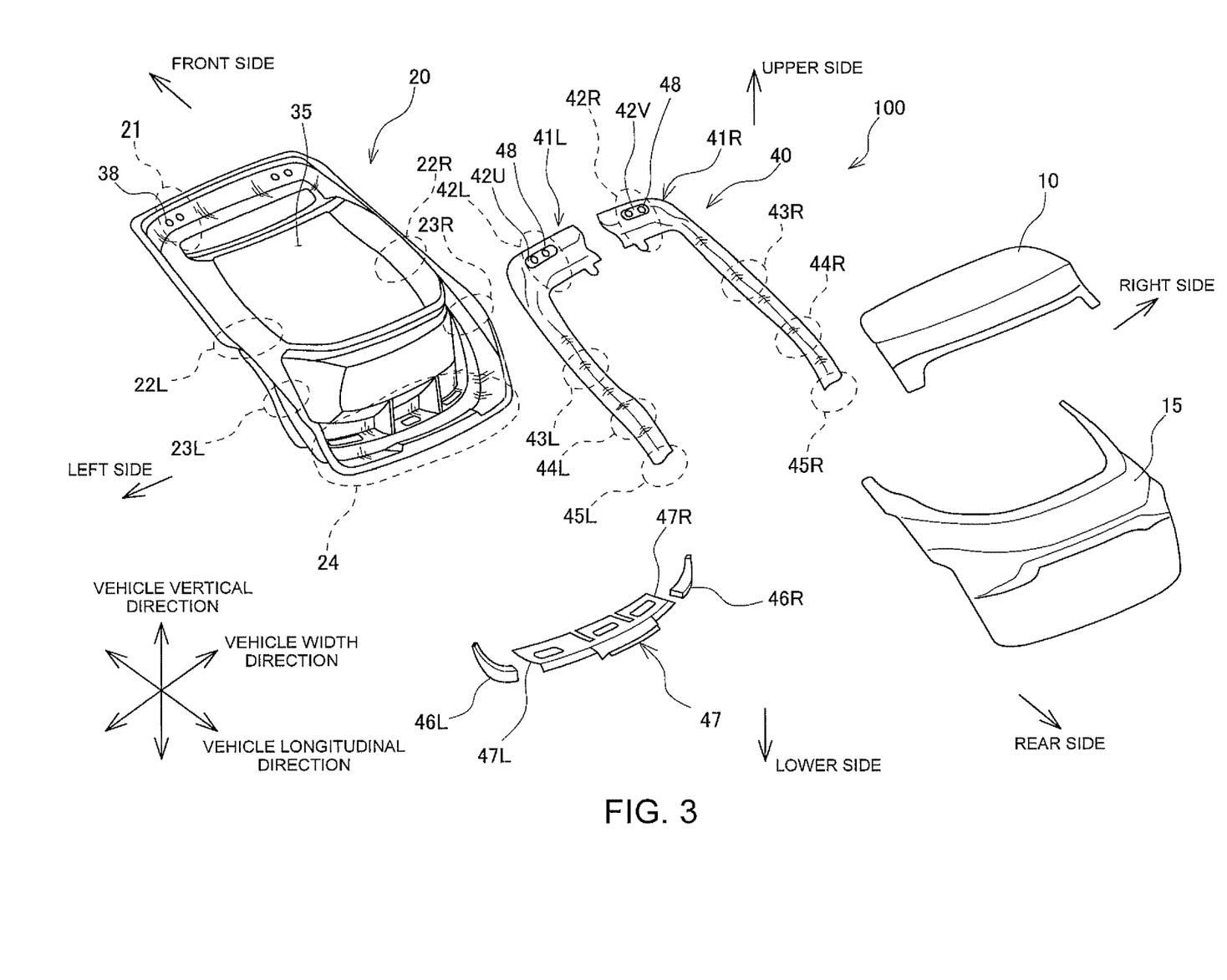
FIG. 3 is an exploded perspective view of a resin back door according to an embodiment.

The resin back door 100 of the vehicle 200 includes a resin upper outer panel 10, a lower outer panel 15, and a resin inner panel 20, as illustrated in FIG. 2, and a left reinforcing member 41L, a right reinforcing member 41R, a lower-side reinforcing member 47, a left corner connecting member 46L, and a right corner connecting member 46R which are made of metal and fixed to the inner panel 20, as illustrated in FIG. 3. On an outer side of a lower left portion 23L of the inner panel 20 in a vehicle width direction, a door-side damper stay bracket 70 is attached with bolts 71. Likewise, as illustrated in FIG. 3, on an outer side of a lower right portion 23R of the inner panel 20 in a vehicle width direction, a damper stay bracket 70 is attached. Herein, the right side and the left side are described as the right side and the left side as viewed from a rear side of the vehicle 200.

As illustrated in FIG. 3, an opening 35 for a back window 12 is provided at the center of the inner panel 20, and the inner panel 20 includes an upper side portion 21 positioned above the opening 35 and configured so that the upper outer panel 10 is assembled thereto, a left side portion 22L and a right side portion 22R positioned on outer sides of the opening 35 in a vehicle width direction, and the lower left portion 23L and the lower right portion 23R positioned on the outer sides in a vehicle width direction below the opening 35 and configured so that the lower outer panel 15 is assembled thereto, and a lower side portion 24. On both right and left sides of the upper side portion 21 of the inner panel 20, bolt holes 38 are provided to attach the hinges 75.

The left reinforcing member 41L has a closed-section structure having a substantially L shape along the upper side portion 21, the left side portion 22L, and the lower left portion 23L of the inner panel 20. The right reinforcing member 41R has a closed-section structure having a substantially L shape along the upper side portion 21, the right side portion 22R, and the lower right portion 23R of the inner panel 20. The left reinforcing member 41L includes an upper left shoulder portion 42L, and an upper left arm portion 43L and a lower left arm portion 44L. The upper left shoulder portion 42L is assembled to be opposed to the upper side portion 21 of the inner panel 20. The upper left arm portion 43L and the lower left arm portion 44L are assembled to be opposed to the left side portion 22L and the lower left portion 23L of the inner panel 20, respectively, to extend in a vehicle vertical direction. The upper left shoulder portion 42L has an upper side provided with a recessed portion 42U, and the recessed portion 42U has bolt holes 48 for attaching a hinge.

The right reinforcing member 41R is symmetrical to the left reinforcing member 41L, and includes an upper right shoulder portion 42R, an upper right arm portion 43R, and a lower right arm portion 44R, and the upper right shoulder portion 42R has an upper side provided with a recessed portion 42V in which the bolt holes 48 are provided.

The left corner connecting member 46L is a member having a substantially L shape to connect a lower end portion 45L of the left reinforcing member 41L and a left end 47L of the lower-side reinforcing member 47. The right corner connecting member 46R is a member having a substantially L shape to connect a lower end portion 45R of the right reinforcing member 41R and a right end 47R of the lower-side reinforcing member 47.

In the resin back door 100, bolts are inserted through the bolt holes 38 of the inner panel 20 and the bolt holes 48 in both of the left reinforcing member 41L and the right reinforcing member 41R, and nuts are fastened from the opposite side. Thus, the resin back door 100 is fastened to the hinges 75 fixed to right and left sides of the roof panel 13.

<Structure of Lower Left Portion of Resin Back Door>

Figure 4:
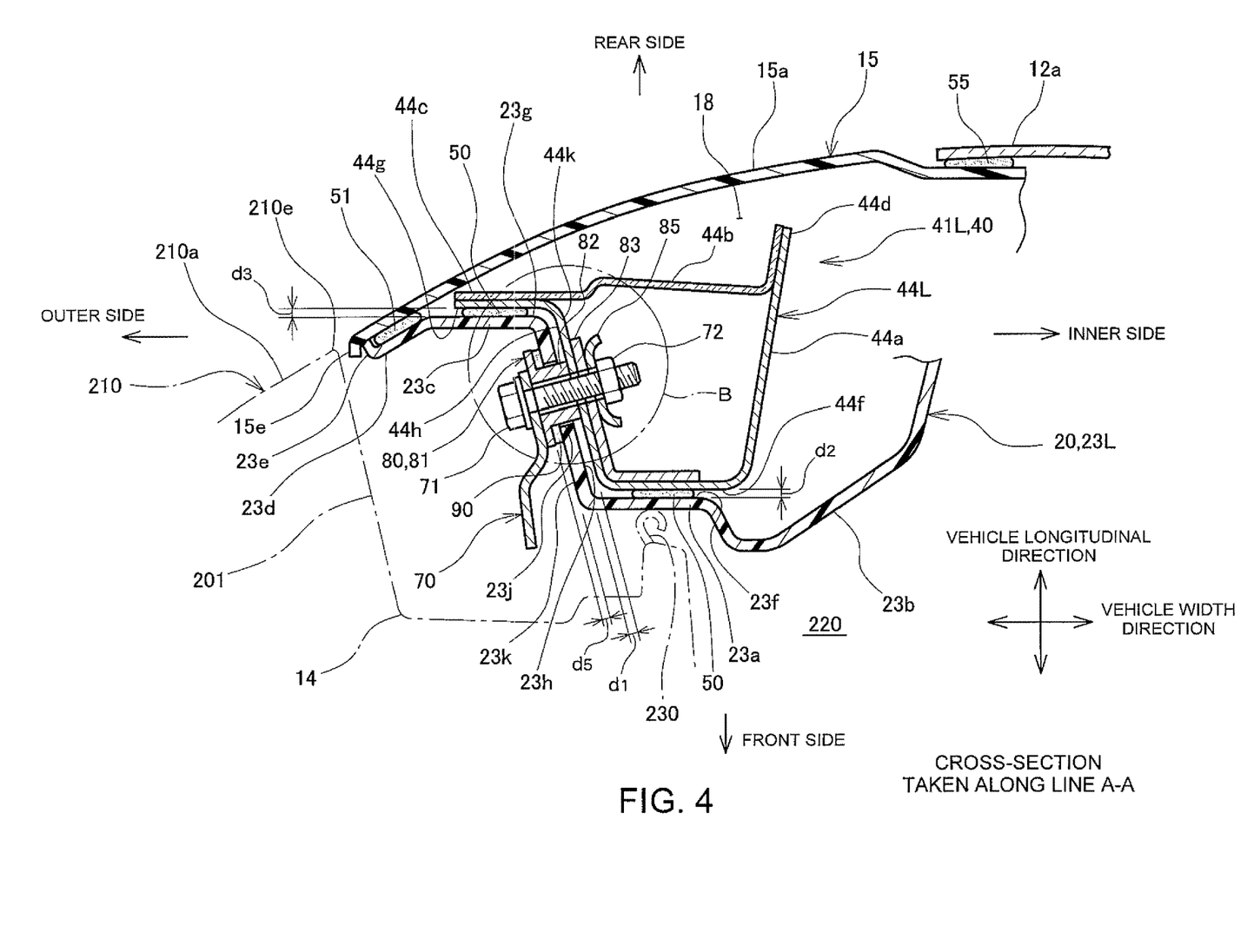
FIG. 4 is a cross-sectional view of a damper stay bracket-mounted portion taken along line A-A of FIG. 2.

As illustrated in FIG. 4, the lower left arm portion 44L of the left reinforcing member 41L and the lower outer panel 15 are assembled to the lower left portion 23L of the inner panel 20. A door-side damper stay bracket 70 is attached to the lower left portion 23L of the inner panel 20 and the lower left arm portion 44L.

The lower left portion 23L of the inner panel 20 includes a groove portion 23a having a substantially U-shape recessed to the front side in a vehicle longitudinal direction, an inner flange 23c, and an outer flange 23d. A bottom surface of the groove portion 23a is positioned on the front side in a vehicle longitudinal direction and is in contact with a sealing rubber 230 attached to the periphery of the door opening 220 of the body 210. An inner vertical wall 23b of the groove portion 23a positioned on the inner side in a vehicle width direction extends to the inner side in a vehicle width direction to cover the door opening 220. Furthermore, an outer vertical wall 23k of the groove portion 23a on the outer side in a vehicle width direction extends from a bottom portion of the groove portion 23a to the rear side in a vehicle longitudinal direction so as to be connected to the inner flange 23c, and in the center portion in a vehicle longitudinal direction, has a hole 23*j* for passing a barrel portion 82 of a collar 80. The inner flange 23*c* bends and extends from a rear end of the outer vertical wall 23*k* of the groove portion 23*a* in a vehicle longitudinal direction to the outer side in a vehicle width direction, and is connected to the outer flange 23*d* extending to the outer side in a vehicle width direction. An outer side of the outer flange 23*d* in a vehicle width direction is formed as a parting portion 23*e* of the inner panel 20 on the outer side in a vehicle width direction. A bottom surface of the groove portion 23*a* on the front side in a vehicle longitudinal direction, a surface of the outer vertical wall 23*k* on the outer side in a vehicle width direction, and surfaces of the inner flange 23*c* and the outer flange 23*d* on the front side in a vehicle longitudinal direction cover the groove-shaped trough 14 provided around the door opening 220.

The lower outer panel 15 includes a center portion 15*a* curving to the rear side in a vehicle longitudinal direction to form a design surface, and an end portion 15*e* assembled to the outer flange 23*d* of the inner panel 20 with an adhesive 51. On the rear side in a vehicle longitudinal direction on the inner side in a vehicle width direction of the center portion 15*a*, a back window glass 12*a* is attached via a sponge 55. The end portion 15*e* is integrated with the parting portion 23*e* of the inner panel 20 and is opposed to an end portion 210*e* of the design surface 210*a* of the body 210 positioned near the back door side, leaving a gap. The design surface 210*a* of the body 210 and the design surface of the lower outer panel 15; that is, the end portion 15*e* and center portion 15*a*, constitute a design surface of a rear portion of the vehicle extending via a gap.

As illustrated in FIG. 4, when the lower outer panel 15 curving toward the rear side in a vehicle longitudinal direction is assembled to the inner panel 20 recessed in a U-shape toward the front side in a vehicle longitudinal direction, a hollow space 18 is formed therein, and the lower left arm portion 44L of the left reinforcing member 41L is disposed in the hollow space 18.

The lower left arm portion 44L of the left reinforcing member 41L has a substantially square annular closed-section structure, and includes collar portions 44*c* and 44*d* projecting to the outer side in a vehicle width direction and to the rear side in a vehicle longitudinal direction on the inner side in a vehicle width direction, respectively. The lower left arm portion 44L includes an inner plate 44*a* positioned near the inner panel 20 and an outer plate 44*b* positioned near the outer panel. The inner plate 44*a* has a substantially U-shaped groove and includes collars extending toward the outer side in a vehicle width direction and toward the rear side in a vehicle longitudinal direction on the inner side in a vehicle width direction, respectively. The outer plate 44*b* is a plate-shaped member for closing an opening side of the inner plate 44*a* of U shape, and includes collars attached to both side collars of the inner plate 44*a* at both ends. The collars of the inner plate 44*a* and the collars of the outer plate 44*b* are connected by friction stir welding (FSW) or spot welding to form the collar portions 44*c* and 44*d*. A surface 44*f* of the bottom portion of the inner plate 44*a* of the left reinforcing member 41L positioned near the inner panel 20 is fixed to a surface 23*f* of the groove portion 23*a* of the inner panel 20 positioned on the rear side in a vehicle longitudinal direction, with an adhesive 50 leaving a gap d2. A surface 44*g* of the collar portion 44*c* of the left reinforcing member 41L positioned near the inner panel 20 is fixed to a surface 23*g* of the inner flange 23*c* of the inner panel 20 positioned on the rear side in a vehicle longitudinal direction, with the adhesive 50 leaving a gap d3.

Figure 5:
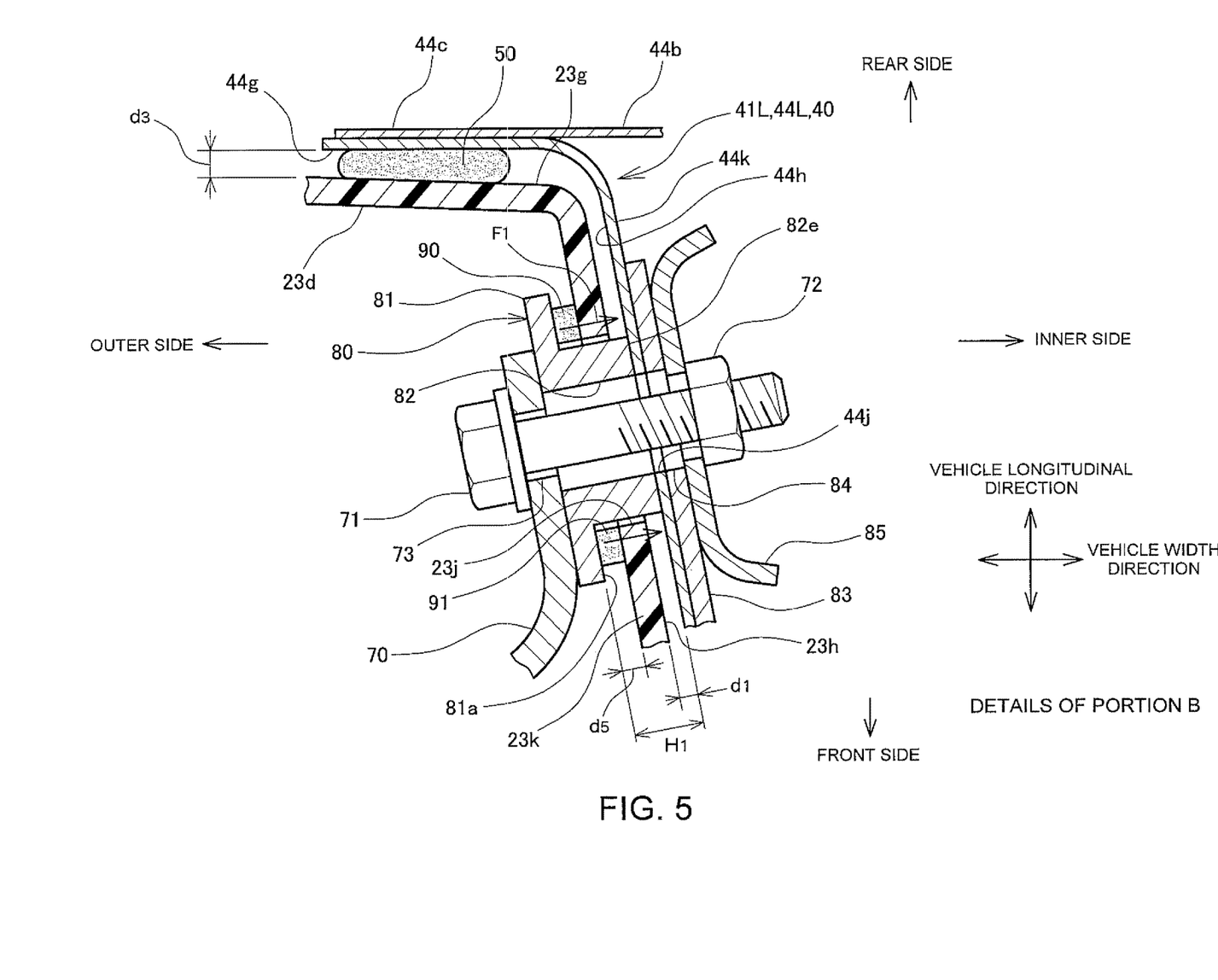
FIG. 5 is a detailed cross-sectional view of a portion B of FIG. 4.

An outer vertical wall 44*k* of the inner plate 44*a* positioned on the outer side in a vehicle width direction extends from the bottom portion of the inner plate 44*a* to the rear side in a vehicle longitudinal direction so as to be connected to the collar portion 44*c*. On the inner side in a vehicle width direction of the outer vertical wall 44*k*, a reinforcing plate 83 is attached by spot welding or the like. The reinforcing plate 83 has a substantially L-shaped plate member extending along the outer vertical wall 44*k* and the bottom portion of the inner plate 44*a*. As illustrated in FIG. 5, a hole 44*j* and a hole 84 for passing a bolt 71 for fixing the damper stay bracket 70 are defined in the outer vertical wall 44*k* of the inner plate 44*a* and the reinforcing plate 83 at the center in a vehicle longitudinal direction, respectively. On the inner side in a vehicle width direction of the reinforcing plate 83, a washer 85 having a U-shaped cross-section is fixed and further a nut 72 is fixed to the washer 85.

As illustrated in FIG. 5, the collar 80 has one end formed into the barrel portion 82 having a cylindrical shape, and the other end, on the opposite side to the one end, formed into a flange 81 having a disk shape projecting radially outwardly from the barrel portion 82. The barrel portion 82 has an outer diameter smaller than the inner diameter of the hole 23*j* provided in the outer vertical wall 23*k* of the lower left portion 23L of the inner panel 20 and the flange 81 has an outer diameter larger than the inner diameter of the hole 23*j*. The height from an end 82*e* of the barrel portion 82 of the collar 80 to a surface 81*a* of the flange 81 is H1.

A sponge 90 as an elastic member is interposed between the flange 81 of the collar 80 and the inner panel 20 around the hole 23*j* of the inner panel 20. The sponge 90 is an annular member with a hole 91 having an outer diameter larger than the outer diameter of the barrel portion 82 of the collar 80 and having an inner diameter substantially equal to or slightly larger than the inner diameter of the hole 23*j*. The sponge 90 has a thickness larger than a gap d5 between the surface 81*a* of the flange 81 positioned near the inner panel 20 and the outer vertical wall 23*k* of the lower left portion 23L of the inner panel 20 where the front end 82*e* of the barrel portion 82 of the collar 80 makes contact with a surface 44*h* of the outer vertical wall 44*k* of the left reinforcing member 41L positioned on the outer side in a vehicle width direction.

<Change in Width of Gap Between Inner Panel and Reinforcing Member and Assembling Method>

Figure 6:
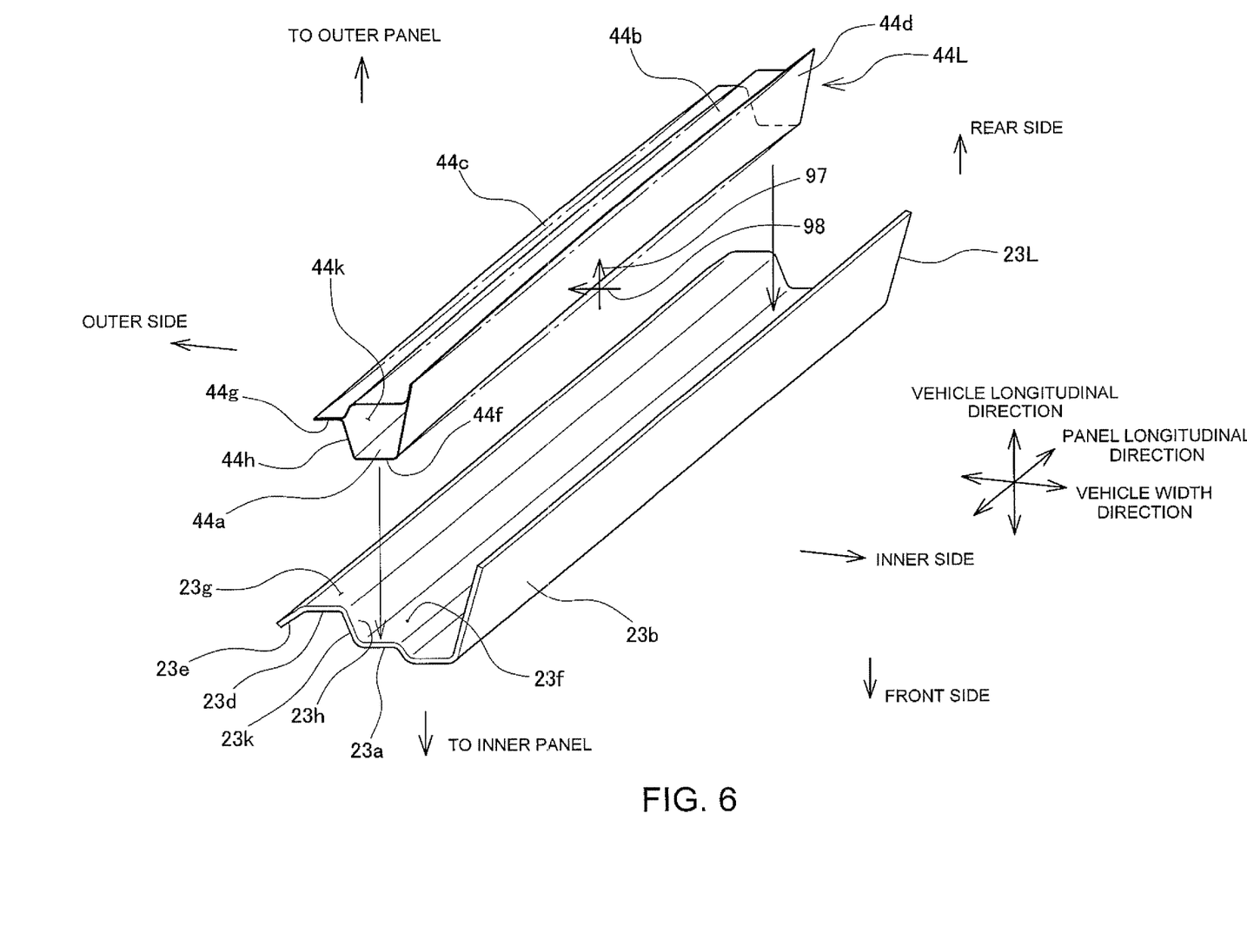
FIG. 6 is a perspective view illustrating assembly of a reinforcing member to an inner panel.

The resin inner panel 20 and the metal reinforcing member 40 described above have manufacturing tolerances. Therefore, when the metal reinforcing member 40 is fixed to the resin inner panel 20 with the adhesive 50 leaving the gaps d1 to d3, the gaps d1 to d3 between the reinforcing member 40 and the inner panel 20 vary. Hereinafter, a variation in the gaps d1 to d3 between the inner panel 20 and the reinforcing member 40 of the resin back door 100, and a method of assembling the reinforcing member 40 to the inner panel 20 will be described with reference to FIGS. 6 to 9. In the following description, variation in the gaps d1 to d3 between the lower left portion 23L of the inner panel 20 and the lower left arm portion 44L of the left reinforcing member 41L will be described. In the following description, as illustrated in FIG. 6, the lower left portion 23L of the inner panel 20 is finished according to a designed shape, but, as indicated by arrows 97 and 98, the lower left arm portion 44L slightly curves to the rear side in a vehicle longitudinal direction and the outer side in a vehicle width direction, relative to the designed shape indicated by a dashed-dotted line. A shift from design dimensions due to curving is within manufacturing tolerance. In the following description, the lower left portion 23L of the inner panel 20 and the lower left arm portion 44L of the left reinforcing member 41L are fixed to a lower jig 120 and an upper jig 130, respectively, the gap d2 between the surface 44f of the lower left arm portion 44L and the surface 23f of the inner panel 20 is set to be a reference gap ds, and the adhesive 50 is filled in the gap d2 to fix the lower left arm portion 44L of the left reinforcing member 41L to the lower left portion 23L of the inner panel 20.

Figure 7:
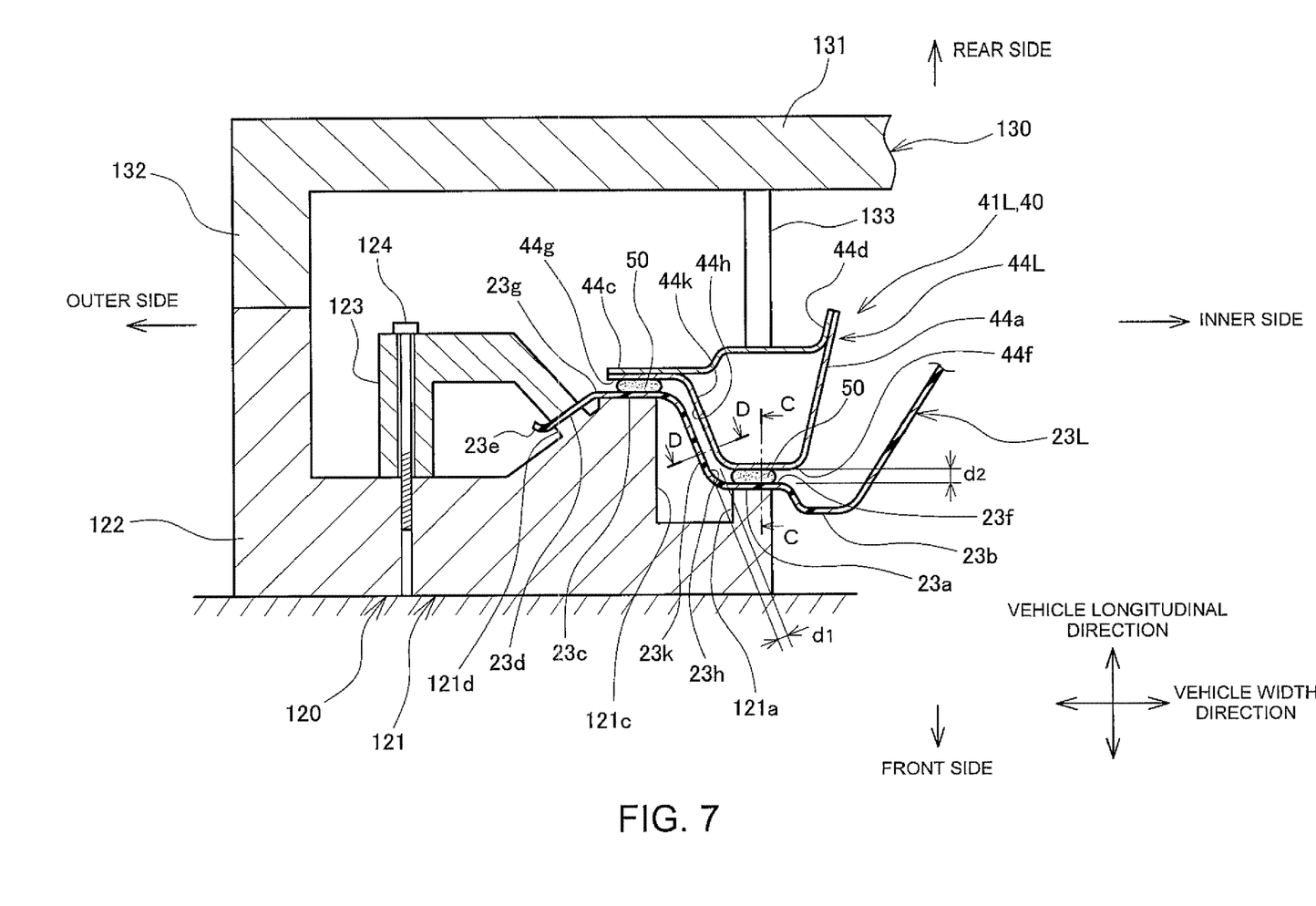
FIG. 7 is an explanatory view of a process of fixedly bonding a reinforcing member to an inner panel leaving a gap.

As illustrated in FIG. 7, the lower left portion 23L of the inner panel 20 is fixed to the lower jig 120. As illustrated in FIG. 7, the lower jig 120 includes a main body 121, a receiving seat 122 provided around the main body 121 to receive the upper jig 130, and a clamp 123 for fixing the outer flange 23d of the lower left portion 23L of the inner panel 20 to the main body 121. The main body 121 includes receiving portions 121a, 121c, and 121d for receiving the groove portion 23a, the inner flange 23c, and the outer flange 23d of the lower left portion 23L of the inner panel 20. The groove portion 23a, the inner flange 23c, and the outer flange 23d are respectively placed on the receiving seats 121a, 121c, and 121d of the main body 121 of the lower jig 120, the outer flange 23d is held by the clamp 123 and a bolt 124 from the rear side in a vehicle longitudinal direction to the main body 121 of the lower jig 120, and the lower left portion 23L of the inner panel 20 is fixed to the lower jig 120.

The upper jig 130 includes a main body 131, an arm 132 placed on the receiving seat 122 of the lower jig 120, and a bracket 133 for holding the lower left arm portion 44L of the left reinforcing member 41L. As illustrated in FIG. 7, when a lower surface of the arm 132 is set on an upper surface of the receiving seat 122 of the lower jig 120 while the lower left arm portion 44L of the left reinforcing member 41L is held by the bracket 133, the gap d2 between the surface 44f of the lower left arm portion 44L and the surface 23f of the inner panel 20 is set to the reference gap ds.

The gap d2 between the surface 44f of the lower left arm portion 44L and the surface 23f of the inner panel 20 varies by ±ed3 indicated by the following Formula 1, where a manufacturing tolerance defining a dimensional variation of the reinforcing member 40 is e30, a manufacturing tolerance defining a dimensional variation of the inner panel 20 is e20, a dimensional variation in assembling for assembling the reinforcing member 40 to the inner panel 20 is ea, a mounting error between the upper jig 130 and the reinforcing member 40 is e80, and a mounting error between the lower jig 120 and the inner panel 20 is e70.

$$\pm ed3 = [(\sqrt{(|e20|^2 + |e30|^2 + |ea|^2)}) + e80 + e70] \quad \text{(Formula 1)}$$

Even though the gap d2 between the surface 44f of the lower left arm portion 44L and the surface 23f of the inner panel 20 varies by ±ed3 as indicated by Formula 1, the reference gap ds is set in accordance with the following Formula 2 to leave a gap not less than a minimum gap dmin.

$$ds = ed3 + d\text{min} \quad \text{(Formula 2)}$$

Figure 8:
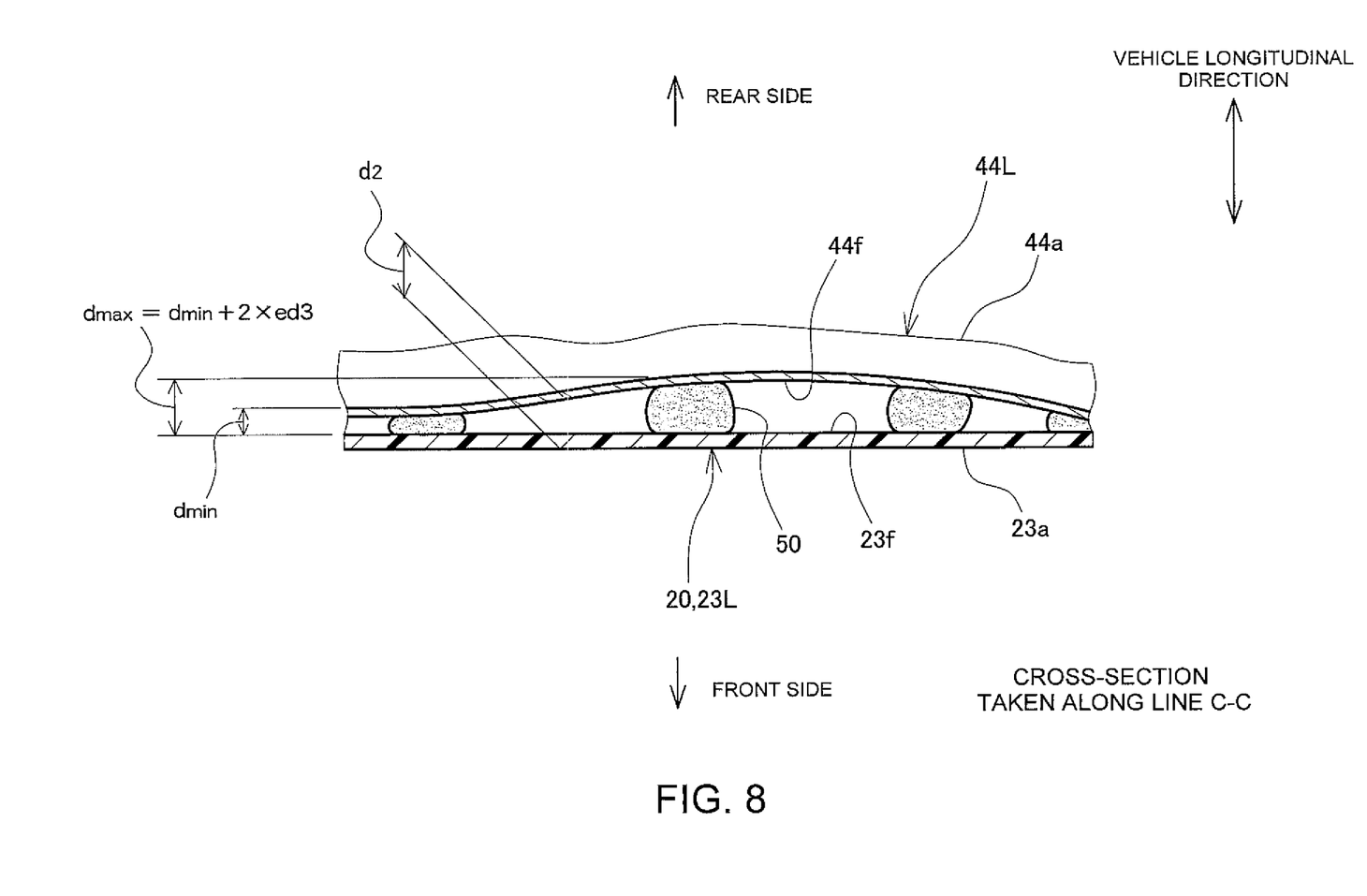
FIG. 8 is a cross-sectional view of variation in width of a gap between the inner panel and the reinforcing member taken along line C-C of FIG. 7.

In this case, the gap d2 between the surface 44f of the lower left arm portion 44L and the surface 23f of the inner panel 20 varies between dmin and dmax=dmin+2*ed3, as illustrated in FIG. 8.

Since the lower left portion 23L of the inner panel 20 is finished according to the design dimensions, the surface 23f of the groove portion 22a positioned on the rear side in a vehicle longitudinal direction is formed into a horizontal linear surface, as shown in FIG. 8. In contrast, since the lower left arm portion 44L of the left reinforcing member 41L slightly curves to the rear side in a vehicle longitudinal direction, the surface 44f of the bottom portion of the lower left arm portion 44L positioned near the inner panel 20 has a surface curving to the rear side in a vehicle longitudinal direction. Therefore, the gap d2 between the surface 23f and the surface 44f has a width varying between a small width dmin at an end portion and a large width dmax at the center portion. Then, the adhesive 50 is filled in the gap d2 varying between dmin and dmax, fixedly bonding the reinforcing member 40 to the inner panel 20. When the adhesive 50 is solidified, the adhesive forms an adhesive layer having a thickness varying according to the width of the gap d2. As illustrated in FIG. 4, the gap d3 between the surface 44g of the collar portion 44c of the left reinforcing member 41L positioned near the inner panel 20 and the surface 23g of the inner flange 23c of the inner panel 20 also varies between dmin and dmax, as in the case of the gap d2. The adhesive 50 is also filled in the gap d3 to fixedly bond the reinforcing member 40 to the inner panel 20. Therefore, the gaps d2 and d3 between the surfaces 44f and 44g of the lower left arm portion 44L and the surfaces 23f and 23g of the inner panel 20 vary due to manufacturing tolerances.

Figure 9:
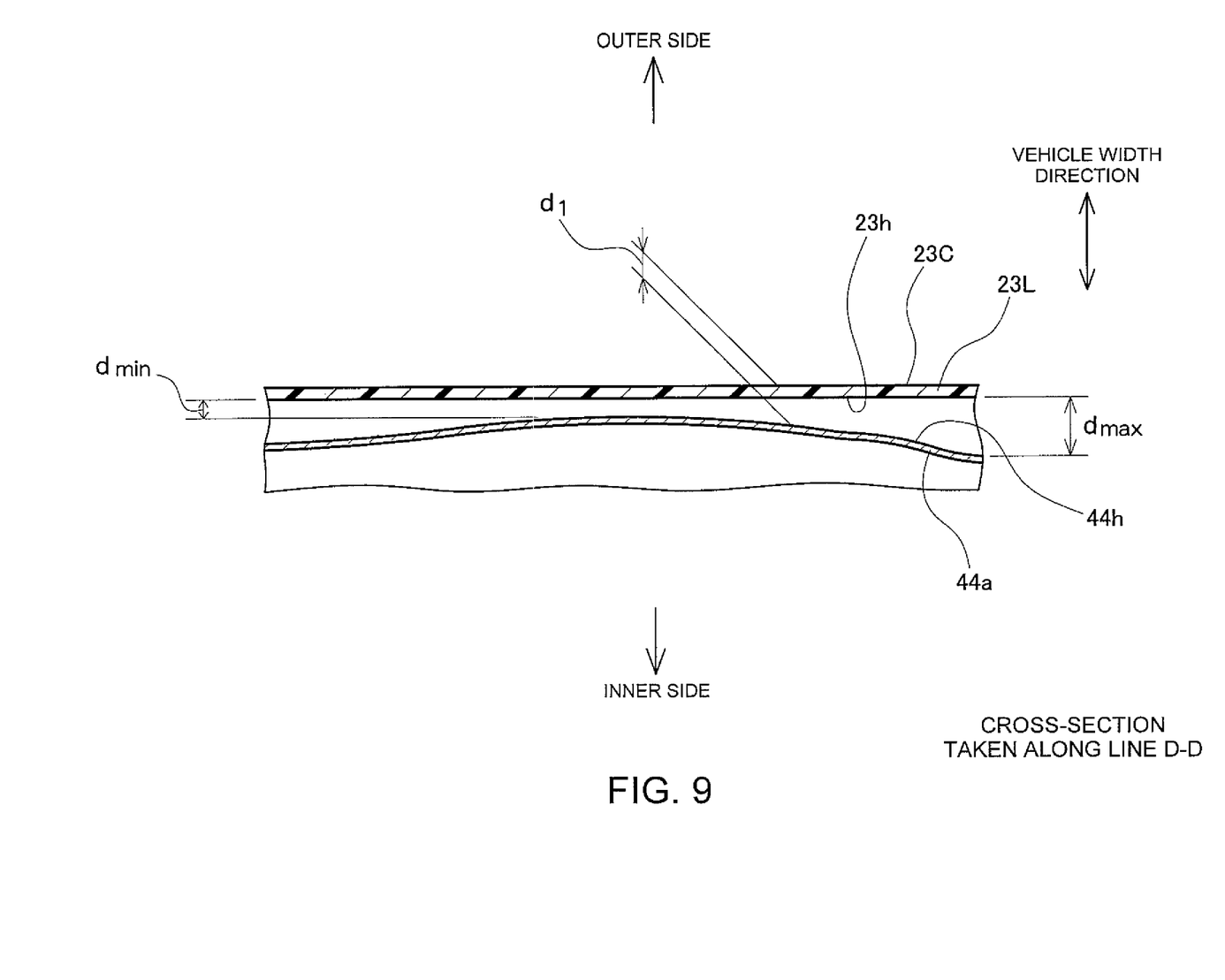
FIG. 9 is a cross-sectional view of variation in width of a gap between the inner panel and the reinforcing member taken along line D-D of FIG. 7.

Likewise, as illustrated in FIGS. 4 and 7, the gap d1 between the surface 44h of the outer vertical wall 44k of the lower left arm portion 44L on the outer side in a vehicle width direction, and a surface 23h of the outer vertical wall 23k of the groove portion 23a of the inner panel 20 on the inner side in a vehicle width direction also varies due to manufacturing tolerances. As illustrated in FIG. 6, when the lower left arm portion 44L slightly curves within the range of manufacturing tolerance from the design shape indicated by the dashed-dotted line to the outer side in a vehicle width direction, as indicated by the arrow 97, the width of the gap d1 between the surface 23h and the surface 44h varies to increase to be dmax at the end portion and to decrease to be dmin at the center portion, as illustrated in FIG. 9.

Figure 11:
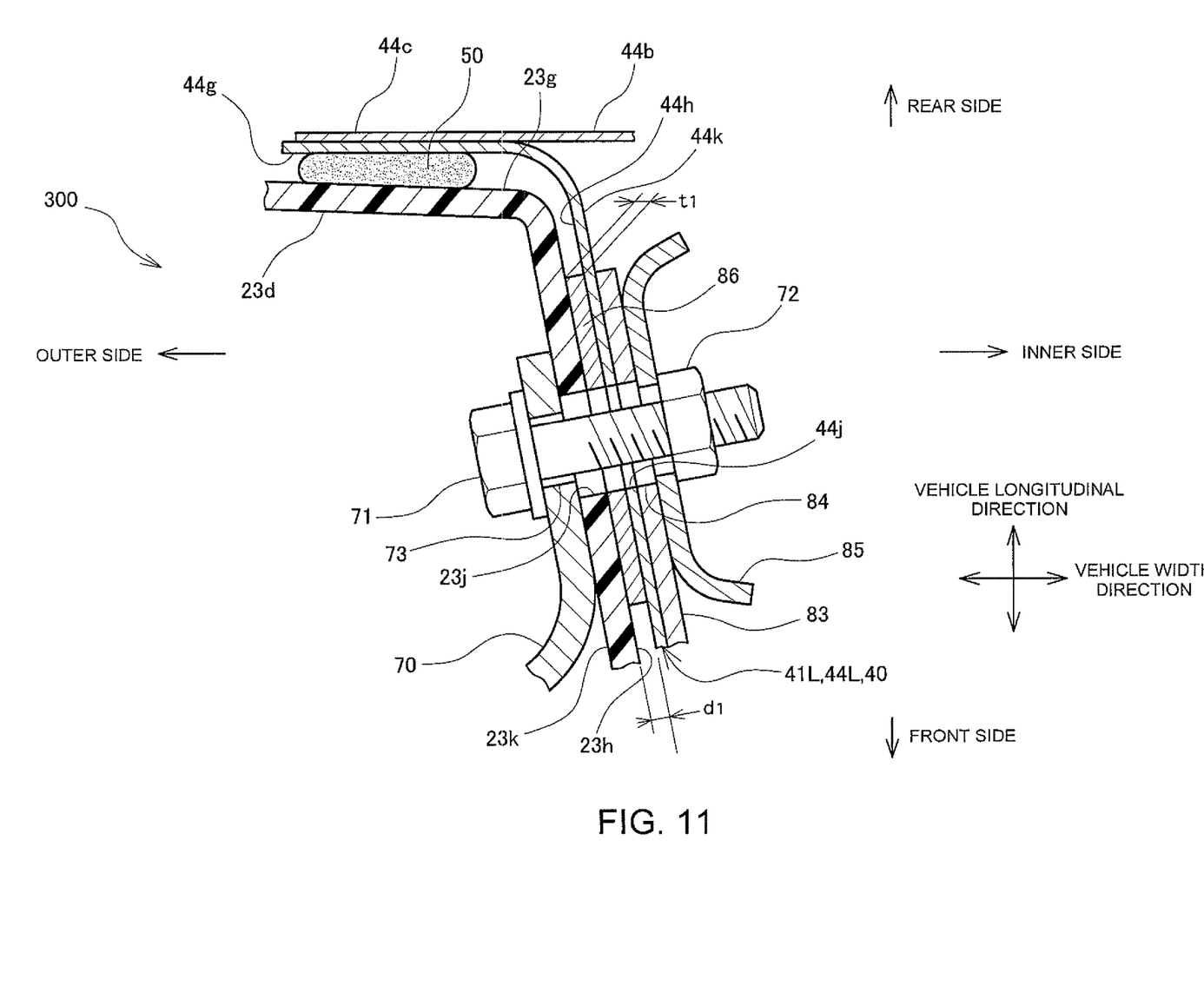
FIG. 11 is a cross-sectional view of a damper stay bracket-mounted portion in a resin back door according to a related art.

In this manner, the width of the gap d1 between the surface 23h and the surface 44h varies due to the manufacturing tolerances of the inner panel 20 and the reinforcing member 40. In a resin back door 300 according to a related art as illustrated in FIG. 11, a spacer 86 having a predetermined thickness t1 is interposed between the surface 23h of the outer vertical wall 23k of the inner panel 20 on the inner side in a vehicle width direction and the surface 44h of the outer vertical wall 44k of the left reinforcing member 41L on the outer side in a vehicle width direction, without using the collar 80, and the damper stay bracket 70, the outer vertical wall 23k of the inner panel 20, the spacer 86, the outer vertical wall 44k of the left reinforcing member 41L, and the reinforcing plate 83 are fastened with a bolt 71 and a nut 72, fastening the damper stay bracket 70 to the inner panel 20 and the left reinforcing member 41L. In such a state, the outer peripheral shape of the resin back door 300 is deformed due to variation in the gap d1. That is, when the gap d1 is larger than the thickness t1 of the spacer 86, the outer vertical wall 23k of the inner panel 20 is pulled toward the outer vertical wall 44k of the left reinforcing member 41L due to the bolt 71 being tightened, and the inner flange 23c and the outer flange 23d of the inner panel 20 are deformed. Therefore, the position of the end portion 15e of the lower outer panel 15 fixedly bonded to the parting portion 23e and the outer flange 23d of the inner panel 20 moves to the inner side in a vehicle width direction, and a gap between the end portion 15e and the end portion 210e of the design surface 210a of the body 210, positioned near the back door and opposed to the end portion 15e and the parting portion 23e illustrated in FIG. 4, increases relative to a designed value. Therefore, deterioration is caused in the appearance of the design surface at the rear portion of the vehicle, including the design surface 210a of the body 210 and the end portion 15e and the center portion 15a which are the design surface of the lower outer panel 15.

In the resin back door 100 according to the present embodiment, the damper stay bracket 70 and the left reinforcing member 41L are fastened across the collar 80 inserted into the hole 23j defined in the inner panel 20, suppressing deformation of the outer peripheral shape of the resin back door 100 upon attaching the damper stay bracket 70.

<Process of Assembling Damper Stay Bracket>

Hereinafter, a process of assembling the damper stay bracket 70 in the resin back door 100 according to the present embodiment will be described. In the following description, attaching the damper stay bracket 70 to the outer side of the lower left portion 23L of the inner panel 20 in a vehicle width direction will be described, but the same applies to attaching the damper stay bracket 70 to the lower right portion 23R of the inner panel 20.

First, the barrel portion 82 of the collar 80 is passed through the hole 91 of the sponge 90 illustrated in FIG. 5. Then, the barrel portion 82 of the collar 80 is inserted into the hole 23j provided in the outer vertical wall 23k from the outer side of the inner panel 20 in a vehicle width direction. Next, a hole 73 in the damper stay bracket 70 is aligned with a hole in the barrel portion 82 of the collar 80, and the bolt 71 is inserted through the hole 73, the barrel portion 82 of the collar 80, the hole 44j in the outer vertical wall 44k of the lower left arm portion 44L of the left reinforcing member 41L, and the hole 84 in the reinforcing plate 83, and a threaded portion at an end of the bolt 71 is engaged with the nut 72. When the end 82e of the barrel portion 82 of the collar 80 makes contact with the surface 44h of the outer vertical wall 44k of the left reinforcing member 41L on the outer side in a vehicle width direction, the thickness of the sponge 90 is larger than the gap d5 between the surface 81a of the flange 81 positioned near the inner panel 20 and the outer vertical wall 23k of the lower left portion 23L of the inner panel 20. In this state, therefore, the end 82e of the collar 80 is not in contact with the surface 44h.

As the bolt 71 is threaded, the sponge 90 is compressed between the surface 81a of the flange 81 and the outer vertical wall 23k of the inner panel 20, and the flange 81 of the collar 80 is moved toward the outer vertical wall 44k of the left reinforcing member 41L. In addition, a reaction force upon compressing the sponge 90 presses the outer vertical wall 23k of the inner panel 20 to the inner side in a vehicle width direction, and the outer vertical wall 23k of the inner panel 20 slightly bends to the inner side in a vehicle width direction. As the bolt 71 is further threaded, the end 82e of the collar 80 abuts on the surface 44h of the outer vertical wall 44k of the left reinforcing member 41L positioned on the outer side in a vehicle width direction. When the front end 82e makes contact with the surface 44h of the outer vertical wall 44k of the left reinforcing member 41L, the compression of the sponge 90 by the flange 81 finishes and the outer vertical wall 23k of the inner panel 20 does not bend any further.

At this time, the gap between the surface 81a of the flange 81 and the outer vertical wall 23k of the inner panel 20 is d5. Since the height H1 from the end 82e of the barrel portion 82 of the collar 80 to the surface 81a of the flange 81 is constant and a thickness of the outer vertical wall 44k of the left reinforcing member 41L is also constant, variation in the width of the gap d1 between the inner panel 20 and the left reinforcing member 41L causes variation in the width of the gap d5 between the outer vertical wall 23k of the inner panel 20 and the flange 81. The variation in the width of this gap d5 is accommodated by the compression of the sponge 90.

Thereafter, when the bolt 71 is threaded to a predetermined torque, attachment of the damper stay bracket 70 is finished. When the attachment of the damper stay bracket 70 is finished, the front end 82e of the collar 80 inserted into the hole 23j provided in the outer vertical wall 23k of the inner panel 20 abuts on the surface 44h of the outer vertical wall 44k of the left reinforcing member 41L positioned on the outer side in a vehicle width direction, and the damper stay bracket 70 is fastened to the left reinforcing member 41L across the collar 80. In addition, the sponge 90 is pressed between the flange 81 of the collar 80 and the outer vertical wall 23k of the inner panel 20. A force F1 directed to the inner side in a vehicle width direction is applied to the outer vertical wall 23k of the inner panel 20 due to the reaction force upon compressing the sponge 90, and the outer vertical wall 23k of the inner panel 20 slightly bends to the inner side in a vehicle width direction. However, this force F1 is small and does not deform the inner flange 23c and the outer flange 23d of the inner panel 20.

As described above, in the resin back door 100 according to the present embodiment, since the damper stay bracket 70 and the left reinforcing member 41L are fastened across the collar 80 inserted into the hole 23j provided in the inner panel 20, even though the gap d1 between the inner panel 20 and the left reinforcing member 41L varies in width, a fastening force of the bolt 71 other than the reaction force upon compressing the sponge 90 is not applied to the inner panel 20 to attach the damper stay bracket 70 to the inner panel 20. Therefore, when attaching the damper stay bracket 70, the inner panel 20 is not attracted strongly to the left reinforcing member 41L due to the fastening force of the bolt 71, and deformation of the outer peripheral shape of the resin back door 100 is suppressed when attaching the damper stay bracket 70. Furthermore, since the damper stay bracket 70 is fixedly fastened to the left reinforcing member 41L with the bolt 71, the attaching strength of the damper stay bracket 70 can be ensured.

Even though a variation in the width of the gap d1 between the inner panel 20 and the left reinforcing member 41L causes a variation in the width of the gap d5 between the outer vertical wall 23k of the inner panel 20 and the flange 81, the sponge 90 is compressed when the damper stay bracket 70 is attached, and the compressed sponge 90 accommodates the variation in the width of the gap d5 and seals around the hole 23j in the outer vertical wall 23k of the inner panel 20. Therefore, even if the gaps d1 and d5 vary in width, it is possible to effectively prevent entrance of water into the resin back door 100 from between the flange 81 and the outer vertical wall 23k of the inner panel 20 during high pressure cleaning or the like.

As described above, the resin back door 100 according to the present embodiment is configured to ensure the attaching strength of the damper stay bracket 70 and suppress deformation of the outer peripheral shape of the resin back door 100 during attachment. Furthermore, entrance of water into the resin back door 100 can be effectively suppressed.

<Resin Back Door According to Another Embodiment>

Next, a resin back door 150 of the vehicle 200 according to another embodiment will be described with reference to FIG. 10. The resin back door 150 according to the present embodiment has a configuration from which the sponge 90 of the resin back door 100 according to the embodiment described above with reference to FIGS. 1 to 9 is eliminated.

Portions having the same structures as those of the resin back door 100 are denoted by the same reference numerals, and description thereof is omitted.

Figure 10:
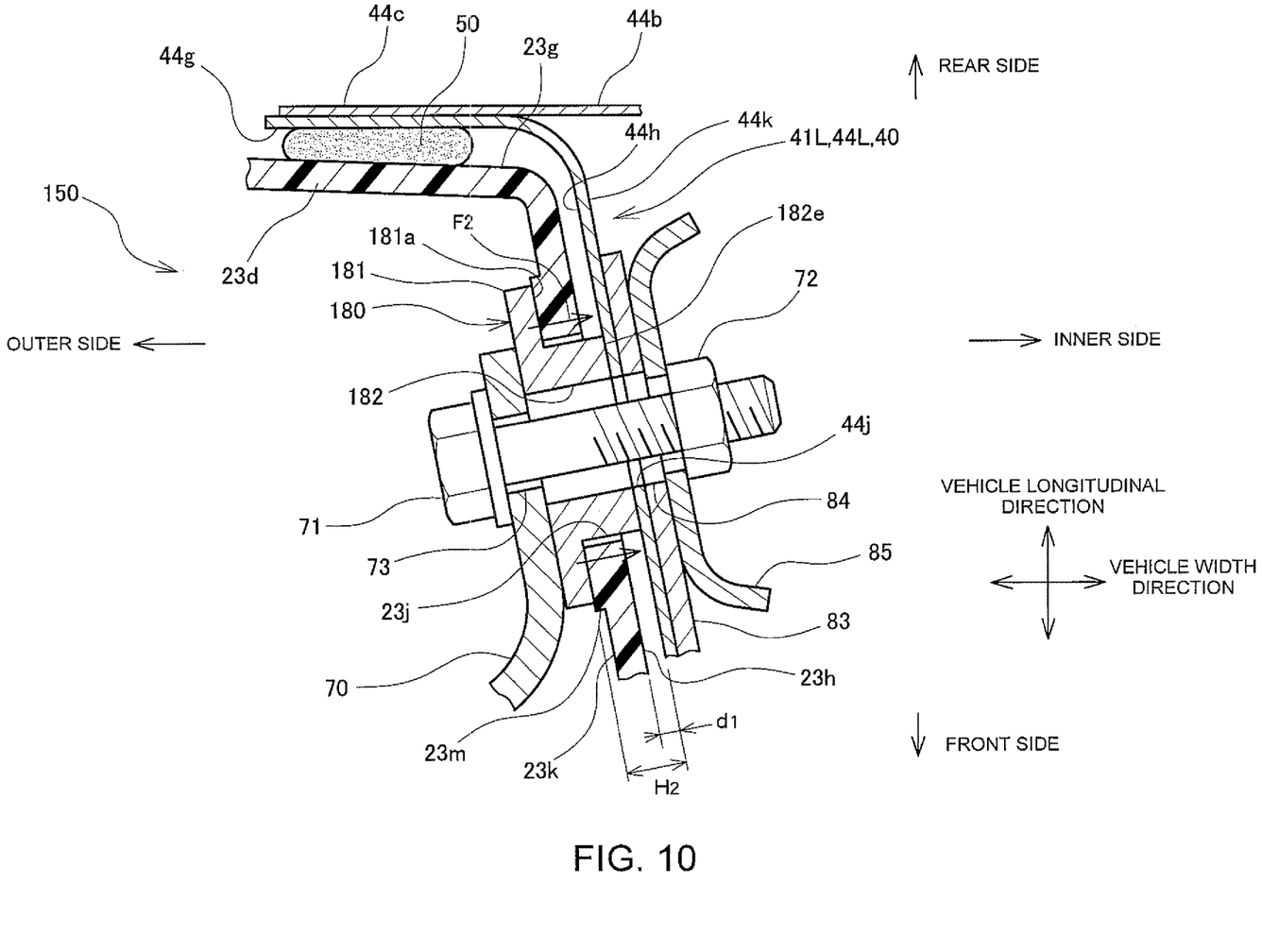
FIG. 10 is a cross-sectional view of a damper stay bracket-mounted portion in a resin back door according to another embodiment.

A collar 180 illustrated in FIG. 10 includes a cylindrical barrel portion 182 and a flange 181, as in the collar 80 described above with reference to FIG. 5. A height H2 from an end 182e of the barrel portion 182 of the collar 180 to a surface 181a of the flange 181 has several kinds of variations in the width of the gap d1 between the inner panel 20 and the left reinforcing member 41L. The height H2 is defined so that when the front end 182e of the barrel portion 182 of the collar 180 makes contact with the surface 44h of the outer vertical wall 44k of the left reinforcing member 41L positioned on the outer side in a vehicle width direction, the surface 181a of the flange 181 positioned near the inner panel 20 slightly presses the inner panel 20 to the inner side in a vehicle width direction, and the surface 181a makes close contact with a surface of a base 23m of the inner panel 20 on the outer side in a vehicle width direction. When the width of the gap d1 is larger than a design dimension, a collar 180 having a large height H2 is used, and when the width of the gap d1 is smaller than the design dimension, a collar 180 having a small height H2 is used.

When the damper stay bracket 70 is attached, a force F2 directed slightly to the inner side in a vehicle width direction from the flange 181 of the collar 180 is applied to the surface of the base 23m of the outer vertical wall 23k of the inner panel 20, and the outer vertical wall 23k of the inner panel 20 slightly bends to the inner side in a vehicle width direction. However, when the end 182e of the collar 180 makes contact with the surface 44h of the outer vertical wall 44k of the left reinforcing member 41L, the flange 181 does not further press the outer vertical wall 23k of the inner panel 20 to the inner side in a vehicle width direction, and the outer vertical wall 23k does not deform any further. Therefore, when the damper stay bracket 70 is attached, the inner panel 20 is not drawn strongly to the left reinforcing member 41L due to a force required for the fastening, and deformation of the outer peripheral shape of the resin back door 100 when the damper stay bracket 70 is attached is suppressed. Furthermore, since the damper stay bracket 70 is fixedly fastened to the left reinforcing member 41L with the bolt 71, the attaching strength of the damper stay bracket 70 can be ensured.

The surface 181a of the flange 181 makes close contact with the surface of the base 23m of the outer vertical wall 23k of the inner panel 20, sealing the hole 23j, thereby suppressing entrance of water from between the flange 181 and the outer vertical wall 23k of the inner panel 20 to the inside of the resin back door 150 during high pressure cleaning or the like.

As described above, in the resin back door 150 according to the present embodiment, the attaching strength of the damper stay bracket 70 is ensured, and deformation of the outer peripheral shape of the resin back door 150 is suppressed when the damper stay bracket 70 is attached, as in the resin back door 100 described above. Furthermore, entrance of water into the resin back door 150 is effectively suppressed.

The invention claimed is:

1. A resin back door for a vehicle comprising:
   a resin inner panel;
   a resin outer panel;
   a metal reinforcing member disposed in a hollow space defined by the inner panel and the outer panel and fixed to the inner panel with an adhesive leaving a gap; and
   a damper stay bracket attached on an outer side of the inner panel in a vehicle width direction,
   wherein the damper stay bracket is fastened to the reinforcing member via a collar having one end inserted into a hole provided in the inner panel.

2. The resin back door for a vehicle according to claim 1, wherein
   the collar has a flange having an outer diameter larger than an inner diameter of the hole provided in the inner panel at the other end opposite to the one end, and
   the resin back door for a vehicle includes an elastic member pressed between the flange of the collar and the inner panel around the hole.

* * * * *